United States Patent [19]

Law

[11] Patent Number: 4,900,068
[45] Date of Patent: Feb. 13, 1990

[54] LIQUID TIGHT CONNECTOR FOR FLEXIBLE NON-METALLIC CONDUIT AND FLEXIBLE NON-METALLIC TUBING

[75] Inventor: Joseph P. Law, Scotch Plains, N.J.

[73] Assignee: Heyco Molded Products, Inc., Kenilworth, N.J.

[21] Appl. No.: 286,272

[22] Filed: Dec. 19, 1988

[51] Int. Cl.[4] .............................................. F16L 3/04
[52] U.S. Cl. ..................... 285/161; 285/249
[58] Field of Search .................. 285/249, 255, 161

[56] References Cited

U.S. PATENT DOCUMENTS

| | | | |
|---|---|---|---|
| 2,452,275 | 10/1948 | Woodling | 285/122 |
| 2,873,985 | 2/1959 | Baldwin, Jr. | 285/342 |
| 2,982,262 | 4/1961 | Franck | 284/248 |
| 3,606,396 | 9/1971 | Prosdocimo et al. | 285/249 X |
| 3,624,812 | 11/1971 | Rosen et al. | 285/161 |
| 3,980,325 | 9/1976 | Robertson et al. | 285/249 |
| 4,637,639 | 1/1987 | Jorgensen et al. | 285/255 X |
| 4,705,304 | 11/1987 | Matsuda | 285/255 X |

FOREIGN PATENT DOCUMENTS 215238 5/1961 Austria ...................... 285/249

OTHER PUBLICATIONS

Exhibit A-A liquid tight connector with a seperable ferrule.
Exhibit B-A liquid tight connector with a rotatable threaded ferrule and circumferential gripper.
Exhibit C-A liquid tight connector with a split washer.

Primary Examiner—Dave W. Arola
Attorney, Agent, or Firm—Auslander & Thomas

[57] ABSTRACT

A liquid tight connector accepts a non-metallic conduit grasped by fingers on a clip grasping above an annular ring on a ferrule. A compression nut engages the fingers. The configuration enables labor saving insertion and effective liquid tight integrity in an inexpensive device.

6 Claims, 3 Drawing Sheets

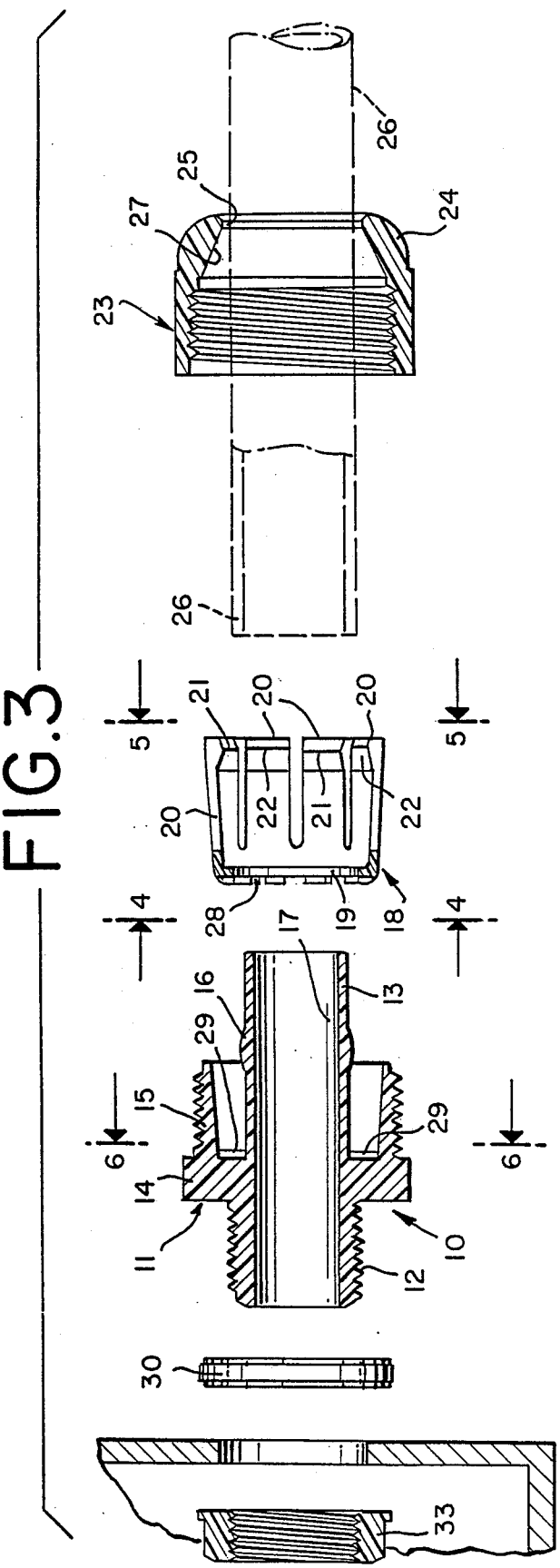

FIG.7
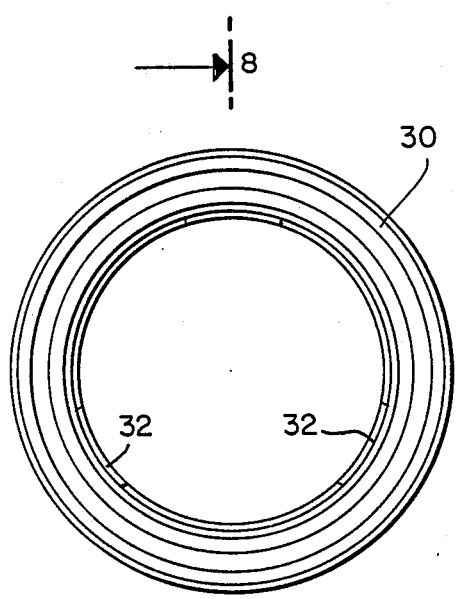
FIG.8
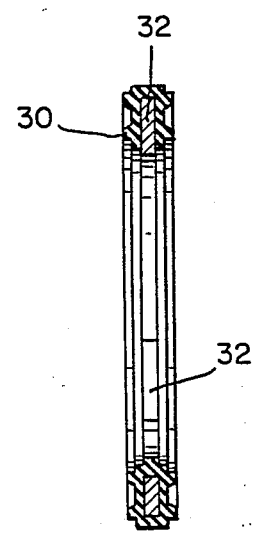
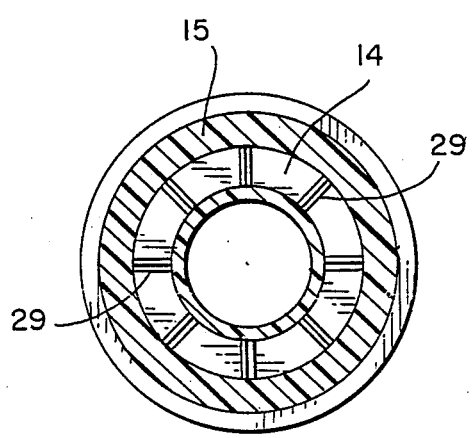
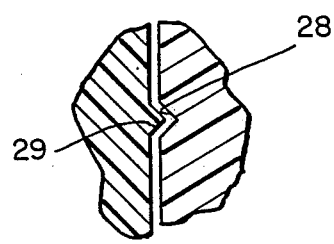
FIG.9
FIG.6

4,900,068

LIQUID TIGHT CONNECTOR FOR FLEXIBLE NON-METALLIC CONDUIT AND FLEXIBLE NON-METALLIC TUBING

BACKGROUND OF THE INVENTION

The present invention is a liquid tight connector for non-metallic conduits connected to the connector at a housing. The system provides protection comparable to that provided by BX cable and BX connectors, but in a liquid tight environment and does it less expensively with more flexibility than found with a conventional BX system.

Current liquid tight connectors on the market require the installer to disassemble the connector, slide the component parts((compressed nut, rubber seal and/or a grip ring) onto the conduit, thread the ferrule into the conduit, then assemble the connector back together. One type of connector requires no disassembly, but requires the installer to screw the connector into the conduit. In doing so, a thread was cut inside the conduit. In time, this cut thread can become a leak path. The first kind of connectors are, of course, labor intensive to install with loose parts easily lost or misplaced and the performance of the connectors depend on the integrity of the installer.

DESCRIPTION OF THE RELATED ART

Both the present invention and prior art liquid tight connectors with conduits generally have extended end portions which fit through apertures in a housing or junction box or other device where the connector is fixed, then sealed against the entry of liquids through the connector, or through the conduit.

In the prior art, a ferrule in the liquid tight connector was usually threaded and oftentimes screwed into the non-metallic conduit. The conduit was about the same size BX cable. The conduit then was sealed in one form or another to the connector.

In one form of prior art device, a separate ferrule was provided, over which an overriding nut with a sealing bushing was tightened. In using such device a nut with its bushing, must have the conduit engaged through it first, before engaging the conduit on the ferrule, after which the overriding nut was tightened over the ferrule, joining the ferrule with the non-metallic conduit to the liquid tight connector. The ferrule generally had a helical thread. The liquid tight integrity of such device, especially where the conduit was attached, was substantially dependent upon the compression of the tightening overriding nut.

In another type of prior art device, the liquid tight connector was conventionally screw engaged from the inside of a housing, with the protruding portion of the liquid tight connector, including a rotatable ferrule with a circumferential gripper. Thus, the liquid tight connector was engaged in the housing and the non-metallic conduit brought up to the ferrule, which was threaded. The ferrule was then rotated into threaded engagement with the non-metallic conduit. The non-metallic conduit threadedly engages itself on the ferrule and inside the outer gripping portion, the outer gripper part was used to enable the rotation of the ferrule. The gripper was on a collar spaced away from the ferrule, forming a channel adapted to receive the non-metallic conduit engaged beneath the collar. This was a very convenient device, but the liquid tight integrity of the device was dependent upon the integrity of the threaded relationship between the non-metallic conduit and the ferrule. This device, of course, had the advantage of not having to screw parts over the non-metallic conduit in order to seal the non-metallic conduit to the liquid tight connector.

In another prior art device, a screw-fitted collar, spaced away from a threaded ferrule, had an annular internal split washer interposed between the screw-fitted collar and the screw threads of the liquid tight connector. In this particular device, a non-metallic conduit was engageable over the ferrule, without the necessity of engaging parts on the non-metallic conduit. The non-metallic conduit was then grasp by the tightening of the screwable collar which closes the split washer over the non-metallic conduit, grasping it. This device is the closest known art to the present invention.

Typical of the prior art is U.S. Pat. No. 2,978,262 where plastic tubing is joined in a fitting, having a threaded base and a compression nut. The purpose of the seal is to seal against corrosive liquids. The seal is effected by compressing a washer over the tubing by use of a compression nut. The tubing sits on a small ferrule.

U.S. Pat. No. 2,873,985 is another prior art device for coupling tubes, including one of many variations, including a compression nut. The tube in the '985 patent is stopped at a shoulder in a bore and sealed with a compression nut engaging a radial shoulder to form a seal.

U.S. Pat. No. 2,452,275 is another typical prior art coupling using a compression nut and split collar.

The prior art is replete with couplings employing compression nuts and even conduits mounted on ferrules in various types of liquid tight engagements.

SUMMARY OF THE INVENTION

The present invention includes the use of a clip which fits circumferentially around a ferrule, spaced away so that a non-metallic conduit can be fitted over the ferrule without and further labor. There is an interference connection of the non-metallic conduit over an annular ring on the ferrule. A compression nut, like a collet, when tightened, engages the fingers of the clip against the non-metallic conduit above the annular ring, holding the non-metallic conduit in sealed non-slip engagement.

The body of the liquid tight connector of the present invention has a ferrule extending beyond a collar. An annular ring is molded midway on the ferrule. Preferably, a generous radius blends the annular ring with the ferrule. When a non-metallic conduit is pushed onto the ferrule, there is no restriction except for the interference fit of the annular ring. Since this annular ring is only in line contact, the restriction is minimal. This interference fit forms a liquid-tight, gas-tight joint and provides some degree of pull out resistance.

The main body is much shorter than the extended ferrule; therefore, liquid settled in the body cannot not find its way into the housing. There is no communication between the non-metallic conduit when affixed to the outside of the ferrule and the passage.

There is a clip which is an annular ring with eight flexible fingers which fit around the ferrule. Each of the fingers are radially closable. On the inside of each finger are molded sharp protrusions which are alternately positioned on the fingers. The alternation allows the fingers to grip onto the non-metallic conduit at two levels. Any irregularities on the non-metallic conduit are thereby compensated. The impressions formed by these fingers on the non-metallic conduit are eight interrupted marks, rather than a continuous ring; thus, the possibility of stripping the insulation is minimized.

The clip, in its free state, is opened to allow restriction free insertion of the non-metallic conduit. The protrusions are positioned above the annular ring of the ferrule so that any expansion of the non-metallic conduit will not interfere with the clip's function. When the clip is in closed position, the non-metallic conduit is trapped between the protrusions on the finger and the annular ring of the ferrule providing a high pull out resistance. On the bottom face of the clip are eight keyways which mate with keys in the body, restricting rotation, and eliminating any twisting of the non-metallic conduit during installation.

There is a compression nut which has a domed top and a conical internal surface. During installation, this conical surface activates the clip by closing its fingers. The compression nut is designed to bottom on the shoulder of the body, thus preventing any over torque.

A sealing ring for the liquid tight connector is an inert molded elastomeric ring. It may be internally reinforced with an aluminum stamped disc to eliminate over-compression which may occur in rubber "O" rings.

A locknut for the end portion of the liquid tight connector is molded with flats to facilitate wrenching.

For liquid tight connectors that are right angled or at 45°, all components are used, except the body is replaced with the angled body.

Another advantage of the present invention is that the non-metallic conduit can be removed from the ferrule. In the prior art, there was usually a coil winding in the non-metallic conduit, thus attempting to unscrew the non-metallic conduit, was working against the spring action of the coil, making it difficult, if not impossible, to remove the non-metallic conduit.

According to the present invention a liquid tight connector connects a non-metallic conduit in liquid tight engagement to a housing, the liquid tight connector includes a body which has an end portion and a ferrule. There is a passage through the ferrule and the end portion. The end portion is attachable to the housing. The ferrule included an annular ring. There is a clip. A non-metallic conduit is interposable on the ferrule between the ferrule and the clip. There are interactive means to engage the clip to grasp the non-metallic conduit in liquid tight engagement between the clip and the ferrule. The clip may grasp the non-metallic conduit beyond the annular ring on the ferrule. There may be a shoulder between the end portion and the ferrule. A collar mounted on the shoulder spaced away from the ferrule may receive the non-metallic conduit between it and the clip as part of the interactive means to grasp the non-metallic conduit. The interactive means may also include a compression nut. The collar and compression nut may be threaded. The clip may include fingers. The fingers may include protrusions some of which may be on different planes. The clip may include a base with an opening for the ferrule to fit through. The base and the body may include interactive keys and keyways. The compression nut may include a sloped inner portion for engaging the clip. The end portion of the housing may include a nut to fix the end portion within the housing. There may also be a washer to form a liquid tight seal between the liquid tight connector and the housing. The washer may include an inner metal ring.

Although such novel feature or features believed to be characteristic of the invention are pointed out in the claims, the invention and the manner in which it may be carried, may be further understood by reference to the description following and the accompanying drawing.

FIG. 3 is an exploded sectional view of FIG. 1.

FIG. 4 is a view of the clip, as shown at lines 4—4 of FIG. 3.

FIG. 5 is a view of the clip, as shown at lines 5—5 of FIG. 3.

FIG. 6 is a sectional view of the body of the liquid tight connector as shown at lines 6—6 of FIG. 3.

FIG. 7 is a plan view of the washer for the liquid tight connector of the present invention.

FIG. 8 is a sectional view of the washer, as shown at lines 8—8 of FIG. 7.

FIG. 9 is an enlarged detail of the key in the body of the liquid tight connector engaged with the keyway of the clip.

Referring now to the figures in greater detail, where like reference numbers denote like parts in the various figures.

Figure 1:
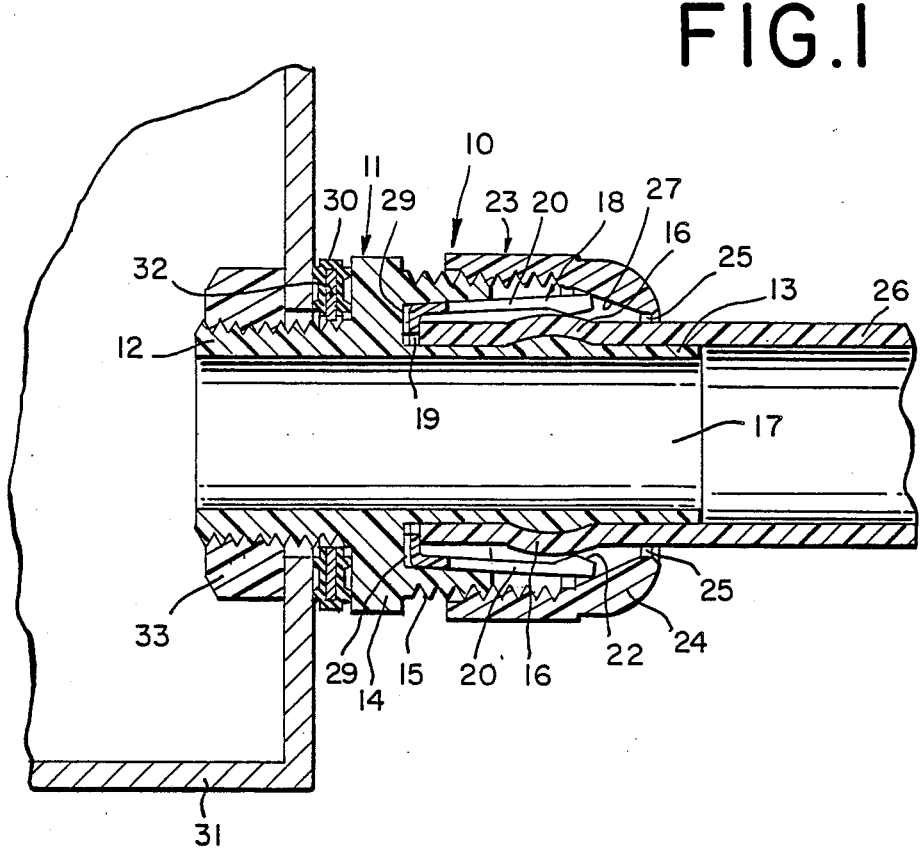
FIG. 1 is a sectional view of the a liquid tight connector in a housing showing a non-metallic conduit before full engagement.
Figure 2:
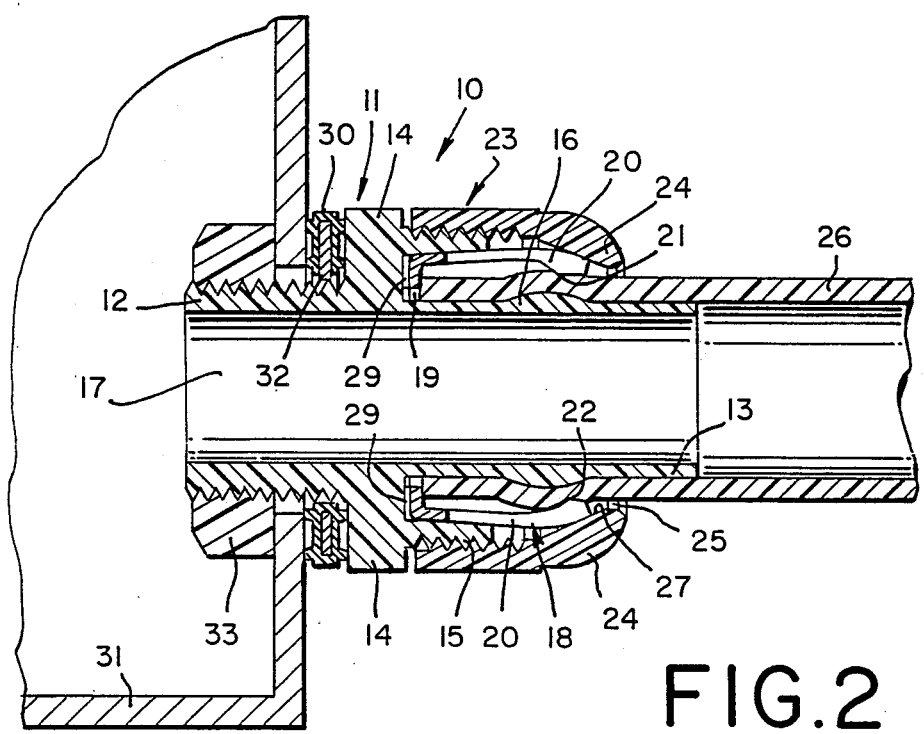
FIG. 2 shows the non-metallic conduit of FIG. 1 fully engaged on the liquid tight connector.

The liquid tight connector 10, as shown in FIGS. 1, 2, 3, comprises a body 11 having an end portion 12 and a ferrule 13. The end portion 12 and ferrule 13 are separated by shoulder 14. A collar 15 extends from the shoulder 14, spaced away from the ferrule 13. The ferrule 13 extends beyond the collar 15 and includes an annular ring 16. The end portion 12 is preferably threaded, as is the collar 15. The body 11 is hollow, having a central passage 17 therethrough.

A clip 18, as shown in FIGS. 1 through 5, has a central opening 19, so that the clip 18 may fit over the ferrule 13 within the periphery of the collar 15. The clip 18 includes resilient fingers 20. The fingers 20 have inwardly facing alternating protrusions 21, 22. A threaded compression nut 23 has a dome 24 with an opening 25, through which a non-metallic conduit 26 may pass and be engaged over the annular ring 16 on the ferrule 13 within the fingers 20 of the clip 18. The inside of the dome 24 of the compression nut 23 is on a slope 27.

As shown in FIG. 4, the clip 18 includes keyways 28, which may interact with keys 29, as shown in FIGS. 6 and 9. The keys 29 extend outward from the shoulder 14. A washer 30 fits over the end portion 12 and is interposable between the body 11 and a housing 31. The washer 30 preferably includes an internal metal ring 32. A nut 33 fits over the end portion 12 so that the liquid tight connector 10 may be fixed in a housing.

In use, the liquid tight connector 10 is fixed in the housing 31 with the compression nut 23 screwed onto the collar 15. The clip 18 is mounted on the ferrule 13 between the collar 15 and the compression nut 23. The non-metallic conduit 26 is pushed onto the ferrule 13 and over the annular ring 16 through the compression nut 23 opening 25 and within the fingers 20 of the clip. The non-metallic conduit 26 bottoms on the clip 18. As can be seen in FIG. 1, the fingers 20 extend beyond the annular ring 16. When the compression nut 23 is tightened, the protrusions 21 and 22 grasp the non-metallic conduit 26 above the annular ring 16 as shown in FIG. 2, so that it is firmly held. The fingers 20 and the protrusions 21 and 22 are forced against the non-metallic conduit 26 by the slope 27 within the dome 24 of the compression nut 23.

The liquid tight connector 10, affixed to the housing 31 by the nut 33 with the washer 30 interposed between the housing 31 and the shoulder 14 on the body 11 of the liquid tight connector 10, forms a liquid tight seal, which prevents not only the entry of liquid into the housing 31, but is probably even gas tight.

The ferrule 13, extending beyond the collar 15, with the non-metallic conduit 26 mounted on it, provides no opening for liquid to get into the passage 17 of the liquid tight connector 10. Any possible liquid would, at most, be engaged between the collar 15 and the ferrule 13. With the fingers 20 tightly engaged around the non-metallic conduit 26 at a point above the annular ring 16 on the ferrule 13, the entry of liquid and/or gas into the passage 17 is substantially impossible.

The metal ring 32 in the washer 30 protects against over-tightening of the nut 33. The washer 30 itself is less likely to be damaged, weakening the liquid tight integrity of the liquid tight connector 10 of the present invention, than the prior art "O" rings. "O" rings nonetheless, may be substituted to make the seal between the housing 31 and the liquid tight connector 10.

Another advantage of the present invention is that replacement of the non-metallic conduit 26 may be achieved by simply loosening the compression nut 23, so that the non-metallic conduit 26 can be withdrawn from its engagement over the annular ring 16.

Once the liquid tight connector 10 of the present invention is engaged in the housing 31, the difficulties of the prior art of attaching the non-metallic conduit 26 are simply overcome. Without further ado, the non-metallic conduit 26 need only be push fit onto the ferrule 13 over the annular ring 16, then have the compression nut 23 tightened to form a grasp and good liquid tight seal.

Preferably, nylon is used to make the liquid tight connector because of convenience. Other plastic material or metal can be used for this invention.

The terms and expression which are employed are used as terms of description; it is recognized, though, that various modifications are possible.

It is also understood the following claims are intended to cover all of the generic and specific features of the invention herein described, and all statements of the scope of the invention which, as a matter of language, might fall therebetween.

I claim:

1. A liquid tight connector adapted to connect a non-metallic conduit in liquid tight engagement to a housing, said liquid tight connector including a body, said body including an end portion and a ferrule, said end portion and ferrule including an opening therethrough forming a passage, said end portion and ferrule including a shoulder therebetween, said ferrule including a radially outwardly protruding annular ring, said annular ring having an outer surface which is sloped from said ferrule, means to connect said end portion to said housing, a collar, said collar mounted on said shoulder, said collar spaced away from said ferrule, said collar including thread means, clip means, said clip means adapted to fit between said collar and said ferrule and adapted to receive said ferrule therethrough, said clip means including a plurality of discrete radial fingers, at least some of said fingers including a protrusion adjacent said ferrule and overlying said annular ring, interposable on said ferrule between said ferrule and said clip a compression nut, said compression nut including thread means, said compression nut's thread means interactive with said collar's thread means, said compression nut including a sloped inner portion, said non-metallic conduit interposable on said ferrule between said ferrule and said clip means and over said annular ring when said compression nut is in threaded engagement with said collar threads and said sloped inner portion adapted to interactively engage said fingers on said clip means to engage said protrusions on said fingers with said non-metallic conduit proximate said annular ring.

2. The invention of claim 1 wherein said protrusions are radial.

3. The invention of claim 1 wherein said means to connect said end portion to said housing includes a nut, said nut adapted to fix said end portion within said housing, a washer, said washer adapted to form a liquid tight seal between said liquid tight connector and said housing, and said washer includes an inner metal ring.

4. The invention of claim 1 wherein at least some of said protrusion are on different planes.

5. The invention of claim 1 wherein said clip means includes a base, said base including an opening, said opening adapted to receive said ferrule therethrough.

6. The invention of claim 5 wherein said base and said body include interactive key and keyway means.

* * * * *

UNITED STATES PATENT AND TRADEMARK OFFICE
CERTIFICATE OF CORRECTION

PATENT NO. : 4,900,068

DATED : February 13, 1990

INVENTOR(S) : Joseph P. Law

It is certified that error appears in the above-identified patent and that said Letters Patent is hereby corrected as shown below:

IN THE SPECIFICATION

Column 1, line 16, after "parts", delete extra parenthesis

IN THE CLAIMS

Claim 1, line 21, after "," delete from "interposable" to "clip", line 22.

line 30, after "threads" insert -- , --

Signed and Sealed this

Twentieth Day of August, 1991

Attest:

HARRY F. MANBECK, JR.

Attesting Officer

Commissioner of Patents and Trademarks